United States Patent [19]
Robecchi

[11] Patent Number: 5,181,890
[45] Date of Patent: Jan. 26, 1993

[54] ELASTIC DRIVING BELT AND PROCESS FOR IDENTIFYING AND DETECTING RESIDUAL ELASTIC ELONGATIONS IN SAID BELT STRETCHED BETWEEN TWO PULLEYS

[75] Inventor: Edoardo Robecchi, Milan, Italy

[73] Assignee: Pirelli Trasmissioni Industriali S.p.A., Milan, Italy

[21] Appl. No.: 628,098

[22] Filed: Dec. 14, 1990

[30] Foreign Application Priority Data

Dec. 22, 1989 [IT] Italy ................. 22816 A/89

[51] Int. Cl.$^5$ ............................................. F16G 1/10
[52] U.S. Cl. ................................... 474/237; 474/268
[58] Field of Search ............... 474/237, 252, 260, 263, 474/265, 268, 238, 249

[56] References Cited

U.S. PATENT DOCUMENTS

| | | | |
|---|---|---|---|
| 2,792,319 | 5/1957 | Fihe | 474/237 |
| 3,453,900 | 7/1969 | Orndorff Jr. et al. | 474/260 X |
| 3,566,706 | 3/1971 | Fix | 474/237 X |
| 3,584,516 | 6/1971 | Burpulis | 474/261 X |
| 3,656,359 | 4/1972 | Dorf et al. | 474/237 X |
| 3,667,308 | 6/1972 | Schwab et al. | 474/264 X |
| 3,863,516 | 2/1975 | Fisher et al. | 474/265 X |
| 4,169,393 | 10/1979 | Wetzel et al. | 474/268 X |
| 4,473,367 | 9/1984 | Wiegelmann | 474/265 |
| 4,678,455 | 7/1987 | Hollaway Jr. | 474/268 X |
| 4,708,703 | 11/1987 | Macchiarulo et al. | 474/263 X |
| 4,822,324 | 4/1989 | Georget | 474/268 |
| 4,931,030 | 6/1990 | Robecchi | 474/237 |
| 4,934,992 | 6/1990 | Simon et al. | 474/268 |
| 4,994,000 | 2/1991 | Simon et al. | 474/268 X |

FOREIGN PATENT DOCUMENTS 244938 10/1986 Japan ................. 474/268

OTHER PUBLICATIONS

Observations presented by a third party against the patentability of corresponding European Application; in the form of a Feb. 17, 1982 letter from Cabinet Ores of Paris, France and an English language translation thereof (6 pages).

*Primary Examiner*—Rodney M. Lindsey
*Attorney, Agent, or Firm*—Stevens, Davis, Miller & Mosher

[57] ABSTRACT

An elastic driving belt stretched between two pulleys of fixed distance between centers and having a predetermined starting tensioning, undergoes a permanent elongation such that the residual elastic elongation has a percent value included between the detectable percent contraction values along the inner edge of the belt itself when the latter is respectively wound according to two predetermined bending lines, the residual elastic elongation being detected by measuring the residual tensioning value on the belt when the permanent elongation has occurred, and reading the elongation value corresponding to the residual tensioning value on a load-elongation graph relating to the belt.

1 Claim, 1 Drawing Sheet

U.S. Patent    Jan. 26, 1993    5,181,890
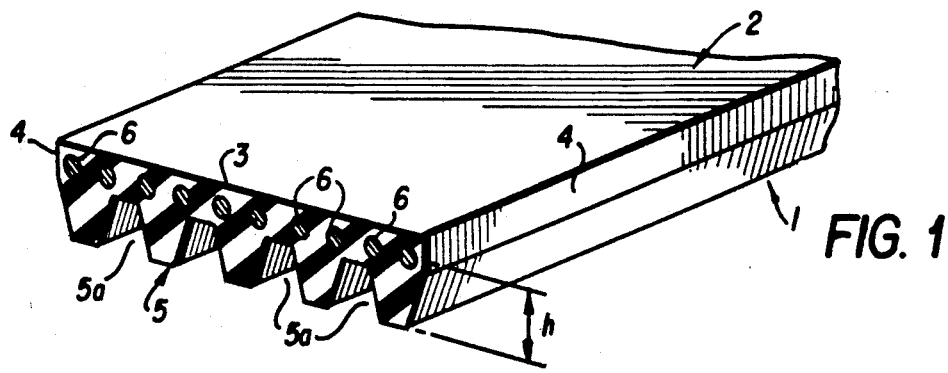
FIG. 1
FIG. 2
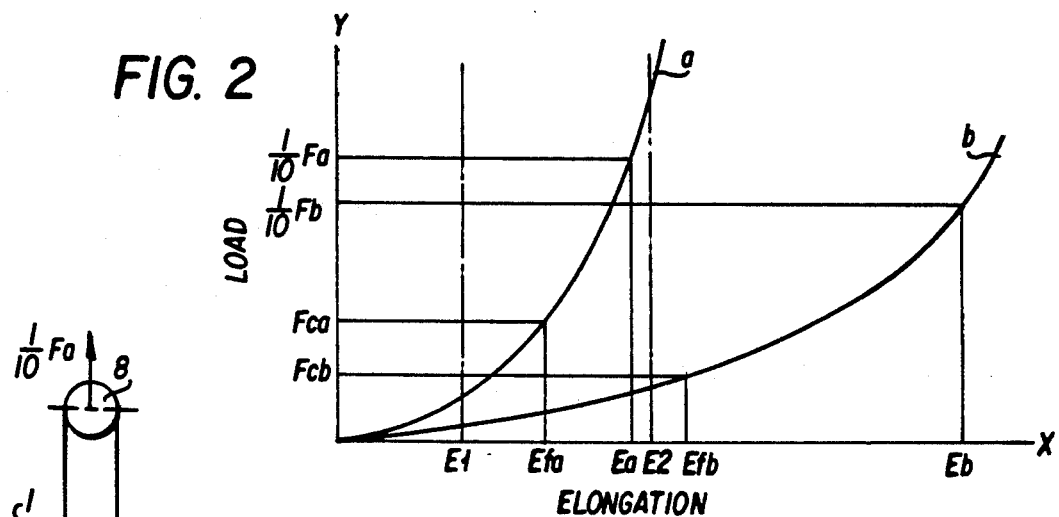
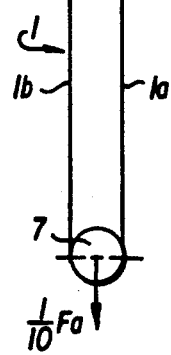
FIG. 3
FIG. 4
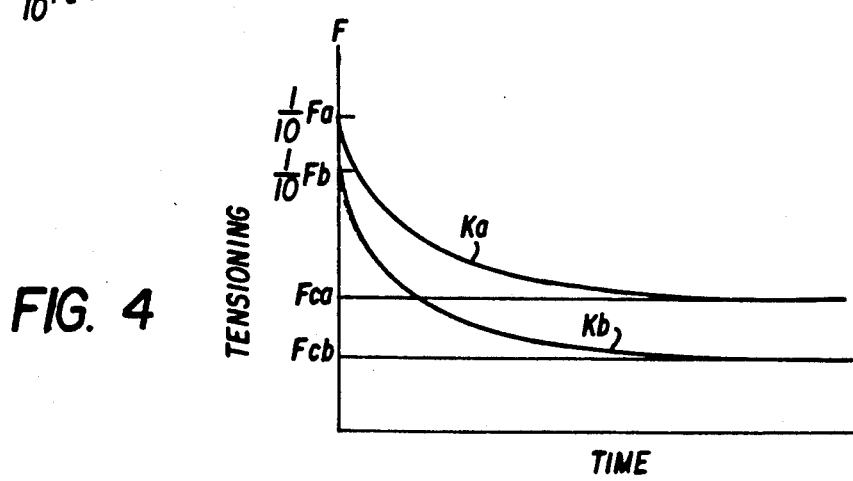

ELASTIC DRIVING BELT AND PROCESS FOR IDENTIFYING AND DETECTING RESIDUAL ELASTIC ELONGATIONS IN SAID BELT STRETCHED BETWEEN TWO PULLEYS

The present invention relates to an elastic driving belt and to a process for identifying and detecting residual elastic elongations in said belt stretched between two pulleys, said elastic belt being of the type comprising: an annular body made of elastomeric material; a plurality of elastic filiform elements extending lengthwise within the annular body and disposed in mutual side-by-side relation according to a line substantially defining the neutral deflection axis of the belt in a free state.

It is known that driving belts in general are essentially comprised of an annular body made of elastomeric material within which extend a plurality of filiform elements disposed in mutual side-by-side relation, said elements substantially performing the function of resisting the tensile stresses imposed on the belt in use.

In a very recent embodiment of driving belts, the filiform elements are practically inextensible. This feature has been found to give rise to serious problems when the belt is mounted on pulleys of very reduced diameter.

This is due to the fact that the deflection to which the annular body of the belt it subjected when the belt is passed over the respective pulleys causes a contraction of the elastomeric material at or along the inner edge of the belt, which contractions are increasingly greater as the bending undergone by the belt becomes more marked. Therefore, when the pulleys have a very reduced diameter, the contractions can reach such an extent that important localized deformations may be produced in the whole section of the elastomeric material, from the attachment or contact areas to the filiform elements inclusive.

Under these use conditions, the belt is always subjected to early wear due to the fact that the elastomeric material is liable to become detached from the filiform elements and to be cut by the same.

Therefore, as a rule driving belts provided with inextensible filiform elements are not used on pulleys having diameters smaller than 40 millimeters.

In order to overcome the above restrictions, applicant has fabricated driving belts in which the filiform elements are elastically extensible so that a predetermined elastic elongation of the belt takes place when the belt is stretched, in use, on the respective pulleys. The elastic tensioning thus produced over the whole section of the elastomeric material serves to greatly reduce the contractions undergone by said elastomeric material when the belts are passed over the pulleys. A driving belt of the above type was the object of an Italian patent application filed Apr. 27, 1988 under No. 20338-A/88, corresponding to U.S. Pat. No. 4,931,030, to which one may refer for further information, and the contents of which are to be regarded as incorporated herein by reference. In that Italian patent application it is also pointed out that when the filiform elements are subjected to a tension equal to one tenth of their ultimate tensile stress, they must have a percent elongation neutralizing a contraction value of the innermost surface of the belt included between two limit-values corresponding to the belt curving according to two predetermined bendings. Said bendings are defined by respective circumferences the width of which corresponds to 60% and 35% respectively of the width of the circumference according to which the filiform elements in the belt extend.

The belts having the features described in the above Italian patent application enable an important reduction in the pulley size and the diameter of said pulleys can reach values on the order to 15 or 16 mm, without early wear problems occurring.

However, it has been found that, following the trend of reducing the pulley diameters as far as possible, belts adapted for use on pulleys having still smaller diameters are required. For meeting these requirements, the availability of very elastic belts are necessary, capable of undergoing an important elastic elongation at the mounting so as to resist the strong contractions that the elastomeric material will tend to undergo on passing over and around the pulleys.

However, although at first sight this solution does not seem complicated, technical problems arise due to the fact that if the belt elasticity overcomes given parameters, for several reasons the belt itself is subjected to important elongations which become permanent in time and will lead to a gradual decrease of the belt pre-tensioning. Thus the adhesion of the belt to the pulleys will be impaired, as well as, which is still more important, the belt's capability of resisting the contractions of the elastomeric material when the belt is passed over the pulleys.

The main object of the present invention is substantially to solve the foregoing technical problems.

The foregoing as well as still other objects of this invention, which will become more apparent in the course of the following description, are substantially attained by an elastic driving belt, characterized in that said belt which is stretched between two elements having a fixed distance between centers according to a starting tension equal to one tenth of its ultimate tensile stress, undergoes a permanent elongation in time and exhibits a residual elastic elongation the value of which, expressed in percent, ranges between the percent contraction values which are detectable at the base side of the annular body when said belt is respectively bent along one bending line defined by a circumference equal to 60% of the circumferential extension of the belt at the filiform elements, and along a second bending line defined by a circumference equal to 20% of the circumferential extension of the belt at the filiform elements.

Additional features and advantages will best be understood from the detailed description of a preferred embodiment of an elastic driving belt and a process for identifying and detecting residual elastic elongations in the belt itself that is stretched between two pulleys, in accordance with the present invention, given hereinafter by way of non-limiting example with reference to the accompanying drawings, in which:

FIG. 1 is a fragmentary perspective view of an elastic belt in accordance with the present invention;

FIG. 2 is a load-elongation diagram referring to two different elastic belts;

FIG. 3 shows an elastic belt stretched between two pulleys for identifying permanent elongations and detecting the residual elastic elongations in the belt itself, the vertical position as shown in the drawing not being essential; and FIG. 4 is a diagram representing the variation in time of the elastic reactions of the belt disposed in and under the conditions shown in FIG. 3, as a result of the gradual increasing of the permanent elongations.

Referring particularly to FIG. 1, an elastic belt in accordance with the present invention has been generally identified by reference numeral 1.

The elastic belt 1 conventionally comprises an annular body 2 made of elastomeric material and extending in an endless line of predetermined length. In the example shown, the annular body 2 has a section of the so-called "poly-V" type, that is provided with several longitudinal grooves on its base or under surface. Actually, it exhibits a rectilinear outer side 3, two opposed lateral sides 4 defining the belt width as a whole, and a lower side 5 having a plurality of substantially V-shaped notches defining respective grooves on the longitudinal extension of the belt.

A number of filiform elements 6 is incorporated in the annular body 2 made of elastomeric material and they extend lengthwise in the body itself, being disposed in side-by-side relation according to a substantially cylindrical surface at a predetermined distance "h" from the lower or inner side 5. The line according to which the filiform elements 6 are distributed conventionally defines the neutral deflection axis of the belt 1 in a free state. In other words, when the belt is bent without any pre-tensioning being produced thereon, that portion of the elastomeric material disposed under the filiform elements 6 (with reference to FIG. 1) undergoes an elastic contraction, whereas that portion of the elastomeric material disposed over the filiform elements is elastically stretched.

In accordance with the present invention, the filiform elements 6 are elastically extensible to such an extent that the belt 1, stretched between two elements having a fixed distance between centers with an initial tension equal to one tenth of its ultimate tensile stress, undergoes a permanent elongation in time at the end of which it will exhibit a residual elastic elongation of a predetermined value.

In greater detail, the residual elastic elongation is arranged to have a value expressed in percent included between the percent contraction values detectable at the inner or lower edge of the belt defined by the extension of the base side 5 thereof, when the belt is respectively bent according to two predetermined bending lines. One bending line is defined by a circumference equal to 60% of the circumferential extension of the belt at the filiform elements 6, whereas the second bending line is defined by a circumference equal to 20% of said extension of the belt.

If the above described features are followed, the belt may then be fitted or mounted on pulleys of very reduced diameter, without running the risk that the permanent elongations undergone by the belt at the mounting may give rise to an excessive reduction in the elastic tensioning of the same, bringing it to such values that it cannot conveniently resist the elastic contractions tending to be set up on the inner or lower edge of the belt due to the belt deflection about the pulleys.

Still in accordance with the present invention, the identification of the permanent elongations and the detection of the residual elastic deformations in the belts are carried out by a process in which it is provided that a load-elongation diagram be first drawn in connection with the belt under examination. Shown in FIG. 2 is such a diagram representing two load-elongation curves marked "a" and "b", respectively, relating to two belts having different elastic features.

The ordinates "y" in the graph of FIG. 2 define the loads relating to curves "a" and "b" whereas the abscissas "x" define the corresponding elongations. In addition, also represented on the abscissas "x" of said graph are the percent values "E1" and "E2" (with inverted or negative signs) of the elastic contractions that can be detected on the inner or lower edge of the belts under examination wound in a free state according to said first and second bending lines.

Said contraction values may be calculated on the basis of the description made in the above mentioned Italian patent application.

Also provided in the process is a step in which the belt 1 under examination is engaged between two pulleys 7, 8 having a diameter ranging between 10 and 50 mm. Pulleys 7 and 8 are pushed apart from each other by per se conventional tensioning means (not shown) in order to subject the belt on each of its branches 1a, 1b, to a tensioning equal to one tenth of its ultimate tensile stress (see FIG. 3).

As can be seen from FIG. 2, at one tenth of the tensile stresses "1/10 Fa" and "1/10 Fb", a starting elastic elongation "Ea" and Eb" is identified on each curve "a" and "b".

The distance between the centers of pulleys 7 and 8 is kept unchanged while the pulleys are set in rotation and the tensioning of the belt 1 is constantly checked as a function of time. Pulleys are driven in rotation at speeds substantially of the same range of magnitude as the maximum speeds of use, for example between 500 and 1000 rpm, as in the case of belts used for washing machines.

With this situation, it can be seen that the belt 1 undergoes permanent elongations causing a reduction in its starting elastic tensioning. Said tensioning therefore will be gradually reduced so far that it becomes stabilized to an almost constant value.

The graph drawn in FIG. 4 shows, by two curves "Ka" and "Kb", the tensioning decreasing value "F" in time "t" exhibited by the belts to which the curves "a" and "b" of the load-elongation diagram of FIG. 2 correspond. Both curves "Ka" and "Kb" prove that the tensioning produced at the beginning on the belt is subject to decrease rather suddenly, afterwards reaching the above specified stable constant value. The stable constant values of the residual tensioning relating to curves "Ka" and "Kb" are respectively denoted by "Fca" and "Fcb" on the ordinates "F" in the graph of FIG. 4.

The values "Fca", "Fcb" of the obtained residual tensioning is then transferred to the load-elongation graph (FIG. 2) corresponding to said tensioning value. The elongation, denoted by Efa", "Efb", represents the residual elastic elongation exhibited by the belt once the constant values "Fca", "Fcb" of the tensioning between pulleys 7, 8 have been reached.

The values "Efa", "Efb" can be immediately compared with the values "E1" and "E2" to make it possible to ascertain whether they are within the range defined by "E1" and "E2" themselves.

With reference to FIG. 2, it is noted that the value "Efa" is within the range "E1", E2 and the corresponding driving belt will therefore be suitable to be used for the above specified purposes.

On the contrary, the residual elongation "Efb" is outside the range defined by the values "E1" and "E2", which fact means that the corresponding driving belt is not suitable for use on pulleys of very small diameter, unless elastic elongation values higher than those closely necessary to resist the elastic contractions on the inner edge of the belt are acceptable.

The outstanding features of any particular elastic belt made in accordance with the invention are hereinafter described, by way of example:

EXAMPLE

"Poly-V" belt, that is of the type having several longitudinal grooves, 1200j6:

Primitive or initial extension: 1178 mm.

Radius "R" corresponding to the primitive or initial extension: $R = 1178/2\pi = 187.5$ mm.

Number of V-shaped grooves: 6.

Groove outline: "j" as per specifications.

Groove height: 2 mm.

Distance h: 3 mm.

Minimum percent contraction value: "E1":

$$E1 = h\frac{(R/0.6R - 1)}{(R - h)} = 1.08\%$$

Maximum percent contraction value: "E2":

$$E2 = h\frac{(R/0.2R - 1)}{(R - h)} = 6.5\%$$

Filiform inserted elements: 17 coils of cord disposed in side-by-side relation according to a cylindrical surface spaced apart from the inner or lower belt edge by a distance "h".

Cord: made up of two strands each having 940 monofilaments ($940 \times 2$), twists per cm of the 48z type for each strand and twists per cm of the 48s type on the two strands, one strand with the other. Cord diameter = 0.55 mm.

Ultimate tensile stress of the cord: 145 N (Newton).

Percent elongation of the cord at one tenth of the tensile stress: 3.5%.

Tensile stress of the belt: 4000 N (2000 N per branch)

Elastic percent elongation of the belt at the beginning at one tenth of the tensile stress: 2.27%.

Constant tensioning value of the belt obtained after the previously described dynamic test starting from a load of 400 N: 233 N.

Value of the residual elastic elongation expressed in percent at a load of 233 N (Newton) included between 1.08% and 6.5% resulting in a value of: 1.35%.

The elastic driving belt of the present invention is thus shown to attain the intended purposes.

The belts manufactured using the innovative measures of the present invention are in fact capable of working with great reliability even when combined with pulleys of very reduced diameter, such as in the range of 8–10 mm.

What is claimed is:

1. In a transmission system having an elastic belt with an annular body made of elastomeric material and a plurality of elastic filiform elements resistant to tensile stress which are embedded in said annular body at a position substantially corresponding to the position of a neutral axis of said annular body, said belt being bent along a first bending line defined by a circumference having a radius equal to 60% of a radius R of a circumferential development of said annular body corresponding to the position of said elastic filiform elements undergoing bending from which derives a first contraction value E1 of a radially innermost surface of said annular body and being bent along a second bending line defined by a circumference having a radius equal to a preset percent value of said radius R of said circumferential development undergoing bending from which derives a second contraction value E2 of said radially innermost surface of said annular body, said elastic belt at 1/10 of its ultimate tensile stress having an elongation value that balances a contraction value ranging between said first and said second contraction value, and at least two pulleys, said belt being mounted between said pulleys in a state of elastic pretension, the improvement comprising i) said preset percent value is equal to 20%,
ii) said elongation is the value of a residual elastic elongation and
iii) the diameter of at least one of said pulleys is less than 15 mm.

* * * * *